(12) United States Patent
Kim (10) Patent No.: US 10,000,234 B2
(45) Date of Patent: Jun. 19, 2018

(54) STEERING CONTROL APPARATUS AND METHOD OF STEER-BY-WIRE SYSTEM

(71) Applicant: HYUNDAI MOBIS CO., LTD., Seoul (KR)

(72) Inventor: Tae Hong Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days. days.

(21) Appl. No.: 15/647,085

(22) Filed: Jul. 11, 2017

(65) Prior Publication Data

US 2018/0015945 A1    Jan. 18, 2018

(30) Foreign Application Priority Data

Jul. 12, 2016    (KR) .................. 10-2016-0088256

(51) Int. Cl.
| | | |
|---|---|---|
| *B26D 5/04* | (2006.01) | |
| *B62D 5/04* | (2006.01) | |
| *B62D 6/00* | (2006.01) | |
| *B62D 6/02* | (2006.01) | |
| *B62D 6/08* | (2006.01) | |

(52) U.S. Cl.
CPC .......... *B62D 5/0463* (2013.01); *B62D 6/003* (2013.01); *B62D 6/02* (2013.01); *B62D 6/08* (2013.01)

(58) Field of Classification Search
CPC ........ B62D 5/0463; B62D 6/003; B62D 6/02; B62D 6/08
See application file for complete search history.

(56) References Cited

U.S. PATENT DOCUMENTS

| | | | |
|---|---|---|---|
| 6,427,104 B1* | 7/2002 | Matsushita | B62D 5/0463 701/41 |
| 2002/0033301 A1* | 3/2002 | Clephas | B62D 5/003 180/446 |
| 2006/0060412 A1* | 3/2006 | Bolourchi | B62D 5/008 180/443 |
| 2007/0090782 A1* | 4/2007 | Endo | B62D 5/046 318/432 |

* cited by examiner

*Primary Examiner* — Richard M Camby
(74) *Attorney, Agent, or Firm* — Knobbe Martens Olson & Bear LLP (57) ABSTRACT

A steering control apparatus of an SBW system may include: a power motor configured to output a steering force in the SBW system; a power motor position sensor configured to sense an angular position of the power motor; a steering angle sensor configured to sense a steering angle of a steering wheel; a vehicle velocity sensor configured to sense a vehicle velocity; and a power motor control unit configured to calculate a target steering angle from the steering angle, and drive the power motor according to the target steering angle. The power motor control unit may calculate a feedback steering angle reflecting an output angle of a wheel, calculate a compensation steering angle for variably controlling the output angle of the wheel based on the feedback steering angle and the vehicle velocity, and corrects the target steering angle using the compensation steering angle.

10 Claims, 4 Drawing Sheets

STEERING CONTROL APPARATUS AND METHOD OF STEER-BY-WIRE SYSTEM

CROSS-REFERENCES TO RELATED APPLICATIONS

The present application claims priority to Korean application number KR10-2016-0088256, filed on Jul. 12, 2016, which is incorporated by reference in its entirety.

BACKGROUND OF THE INVENTION

The present invention relates to a steering control apparatus and method of an SBW (Steer-By-Wire) system, and more particularly, to a steering control apparatus and method of an SBW system, which is capable of performing variable active steering depending on a steering angle and vehicle velocity.

Power steering in a vehicle refers to a steering apparatus based on power, and assists a driver's steering wheel operation. Conventionally, a hydraulic power steering system has been mainly used as the power steering. Recently, however, the use of MDPS (Motor Driven Power Steering) system has increased. That is because the MDPS system has a small weight, occupies a small space and does not require an oil exchange, compared to the hydraulic power steering system.

The MDPS system includes a torque sensor, an ECU (Electronic Control Unit) and a motor. The torque sensor senses a steering torque generated by rotations of a steering wheel and outputs an electrical signal proportional to the steering torque, the ECU receives the electrical signal outputted from the torque sensor and outputs a motor driving signal, and the motor generates an assist torque based on the motor driving signal outputted from the ECU. The assist torque generated by the motor is transmitted to a rack, pinion gear or steering column to assist a driver's steering torque. A vehicle having the MDPS system mounted therein may include an AFS (Active Front Steering) or VGR (Variable Gear Ratio) system that varies a ratio of a driver's steering input to an output angle of a wheel, that is, a steering gear ratio, thereby enabling a driver to perform precise steering at higher speed.

The AFS system includes a variable steering gear ratio device installed between the steering wheel and a steering actuator, receives a steering angle of the steering wheel, and outputs a varied rotation angle varied to the steering actuator, thereby varying the steering gear ratio. Typically, the AFS system varies the steering gear ratio depending on the velocity of the vehicle. Specifically, the AFS system may set a high steering gear ratio at a low velocity, thereby obtaining a fast steering characteristic. Also, the AFS system may set a low steering gear ratio at a high velocity to reduce steering sensibility, thereby enabling a driver to perform a stable steering operation.

The VGR system refers to a system that varies a steering gear ratio through a mechanical process of the rack for converting a rotational motion of a pinion at an end of the steering column into a linear motion. The VGR system varies the steering gear ratio by varying a displacement of the rack depending on a steering angle. The VGR system varies the steering gear ratio depending on a steering angle. Specifically, the VGR system may set a low steering gear ratio at a small steering angle, thereby obtaining a more delicate steering characteristic. Also, the VGR system can set a high steering gear ratio at a large steering angle, thereby obtaining a faster steering characteristic.

Recently, the SBW (Steer By Wire) system has been developed and applied. The SBW system has no mechanical connection devices such as a steering column, universal joint and pinion shaft between a steering wheel and a wheel, and steers a vehicle by controlling a motor connected to a rack according to an electrical signal. The SBW system may include a steering wheel for a steering operation of a driver, a reaction motor that is installed at one side of the steering wheel and provides a reaction torque based on rotations of the steering wheel, an actuator that is connected to the rack to implement a steering operation, various sensors for detecting a steering angle, a vehicle velocity and a torque of the steering wheel, and an ECU that drives the actuator and the reaction motor according to electrical signals inputted from the sensors.

Since the SBW system has no mechanical connections, the SBW system can reduce a driver's injury which may be caused by the mechanical connections when the vehicle collides. The decrease in number of mechanical connection parts can reduce the weight of the vehicle and unnecessary energy consumption during a steering operation. Furthermore, ideal steering performance can be achieved by ECU programming. Therefore, the use of the SBW system tends to gradually increase.

Since the conventional MDPS system generates an assist torque by sensing a steering torque generated through a steering wheel operation, the MDPS system necessarily includes the torque sensor for sensing a steering torque. Therefore, when a steering torque is not sensed or a steering torque different from an actual steering torque is sensed due to a breakdown or abnormal operation of the torque sensor, the motor may output an abnormal assist torque, thereby transmitting a sense of difference to the steering operation of the driver.

The AFS system requires an additional variable steering gear ratio device for varying a steering gear ratio and a separate motor for driving the variable steering gear ratio device. Thus, the increase of number of parts may make the system complex, and raise the weight and cost of the system. The VGR system varies a steering gear ratio through a mechanical process of the rack. Thus, once the gear ratio is fixed, the gear ratio cannot be changed. On the other hand, when the VGR system is designed to select a gear ratio, the unit cost of production may be increased, and the structure thereof may become complicated.

The above-described problems correspond to the limits of the conventional steering system including mechanical links, and can be solved through the SBW system which has no mechanical links and controls steering by driving a motor connected to a rack only through an electrical signal.

SUMMARY OF THE INVENTION

Embodiments of the present invention are directed to a steering control apparatus and method of an SBW system, which is capable of removing a sense of difference in a steering operation of a driver, caused by an abnormal operation of a torque sensor in an MDPS system, and variably controlling a gear ratio while preventing the complexity and cost rise of a variable steering gear ratio system such as an AFS or VGR system.

In one embodiment, a steering control apparatus of an SBW system may include: a power motor configured to output a steering force in the SBW system; a power motor position sensor configured to sense an angular position of the power motor; a steering angle sensor configured to sense a steering angle of a steering wheel; a vehicle velocity sensor configured to sense a vehicle velocity; and a power motor control unit configured to calculate a target steering angle from the steering angle sensed by the steering angle sensor, and drive the power motor according to the target steering angle. The power motor control unit may calculate a feedback steering angle reflecting an output angle of a wheel by detecting the angular position of the power motor through the power motor position sensor, calculate a compensation steering angle for variably controlling the output angle of the wheel based on the feedback steering angle and the vehicle velocity sensed by the vehicle sensor, and correct the target steering angle using the compensation steering angle.

The power motor control unit may extract a gear ratio for the feedback steering angle from a preset steering angle-gear ratio map, and calculate the compensation steering angle based on the feedback steering angle, the extracted gear ratio and the vehicle velocity.

The power motor control unit may synchronize the initial steering angle sensed through the steering angle sensor with the current angular position of the power motor, after the vehicle is started.

The steering control apparatus may further include: a rear motor configured to output a steering reaction force in the SBW system; a yaw rate sensor configured to sense a yaw rate of the vehicle; a lateral acceleration sensor configured to sense a lateral acceleration of the vehicle; and a rear motor control unit configured to calculate a reaction gain based on one or more of the steering angle, the vehicle velocity, the yaw rate and the lateral acceleration, which are sensed by the steering angle sensor, the vehicle velocity sensor, the yaw rate sensor and the lateral acceleration sensor, respectively, and drive the rear motor according to the reaction gain.

The steering control apparatus may further include a rear motor position sensor configured to sense an angular position of the rear motor. The rear motor control unit may calculate a rear motor angular velocity by differentiating the angular position of the rear motor, sensed through the rear motor position sensor, and performing low-frequency filtering, extract a compensation gain for the rear motor angular velocity from a preset angular velocity-compensation gain map, and correct the reaction gain using the compensation gain.

In another embodiment, a steering control method of an SBW system may include: sensing, by a steering angle sensor and vehicle velocity sensor, a steering angle of a steering wheel and a velocity of a vehicle; calculating, by a power motor control unit, a target steering angle from the sensed steering angle; driving, by the power motor control unit, a power motor that outputs a steering force in the SBW system, according to the target steering angle; sensing, by the power motor control unit, an angular position of the power motor through the power motor position sensor, and calculating a feedback steering angle reflecting the current output angle of a wheel; and calculating, by the power motor control unit, a compensation steering angle for variably controlling the output angle of the wheel based on the feedback steering angle and the sensed vehicle velocity, and correcting the target steering angle using the compensation steering angle.

In the correcting of the target steering angle using the compensation steering angle, the power motor control unit may extract a gear ratio for the feedback steering angle from a preset steering angle-gear ratio map, and calculate the compensation steering angle based on the feedback steering angle, the extracted gear ratio and the vehicle velocity.

The steering control method may further include synchronizing, by the power motor control unit, the initial steering angle sensed through the steering angle sensor with the current angular position of the power motor, after the vehicle is started.

The steering control method may further include: sensing, by a yaw rate sensor and lateral acceleration sensor, a yaw rate and lateral acceleration of the vehicle, respectively; calculating, by a rear motor control unit, a reaction gain based on one or more of the sensed steering angle, vehicle velocity, yaw rate and lateral acceleration; and driving, by the rear motor control unit, a rear motor that outputs a reaction force in the SBW system, according to the reaction gain.

The steering control method may further include: sensing, by a rear motor position sensor, an angular position of the rear motor; and calculating, by the rear motor control unit, a rear motor angular velocity by differentiating the sensed angular position of the rear motor and performing low-frequency filtering, extracting a compensation gain for the rear motor angular velocity from a preset angular velocity-compensation gain map, and correcting the reaction gain using the compensation gain.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
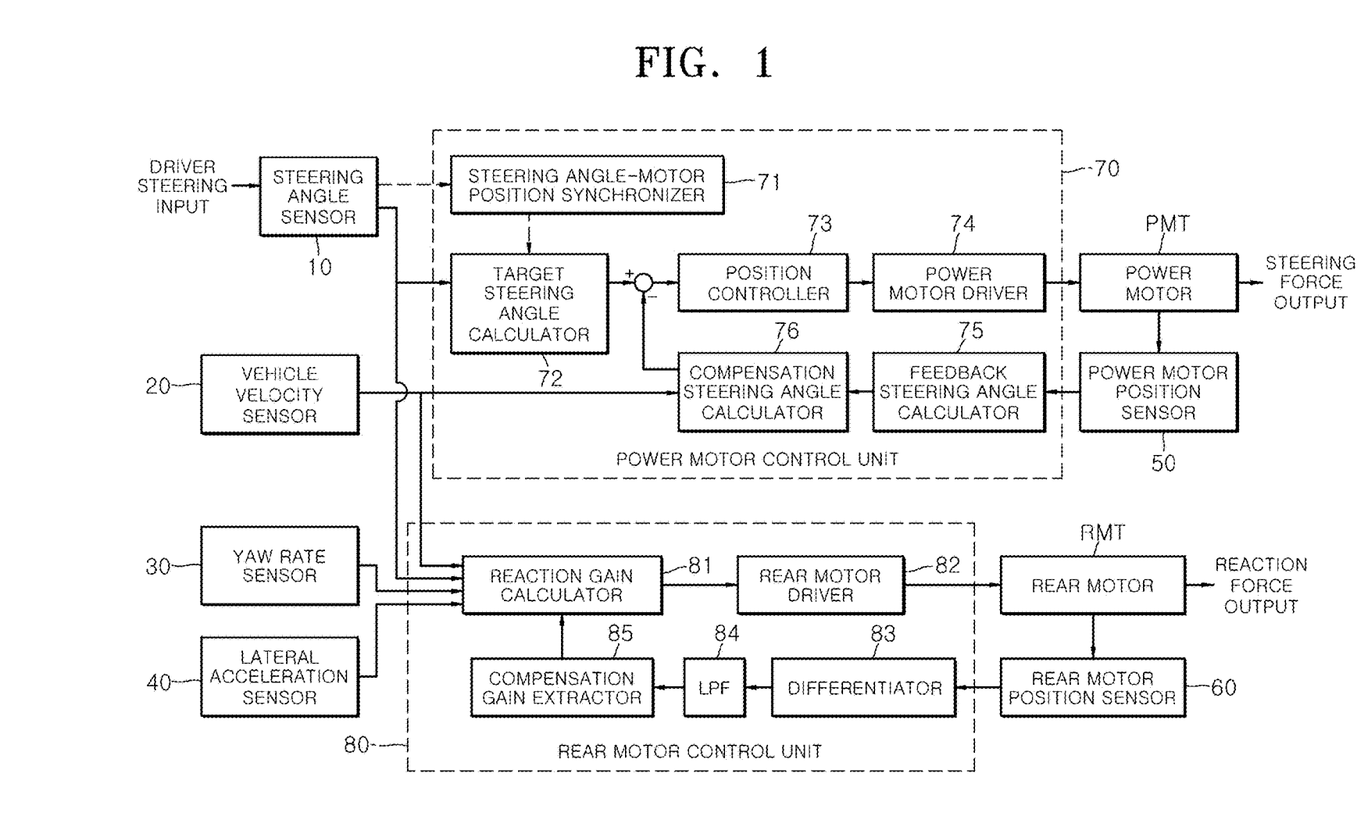
FIG. 1 is a block diagram of a steering control apparatus of an SBW system in accordance with an embodiment of the present invention.

FIG. 1 is a block diagram of a steering control apparatus of an SBW system in accordance with an embodiment of the present invention.

Referring to FIG. 1, the steering control apparatus of the SBW system in accordance with the embodiment of the present invention may include a steering angle sensor 10, a vehicle velocity sensor 20, a yaw rate sensor 30, a lateral acceleration sensor 40, a power motor PMT, a power motor position sensor 50, a rear motor RMT, a rear motor position sensor 60, a power motor control unit 70 and a rear motor control unit 80.

The power motor control unit 70 may include a steering angle-motor position synchronizer 71, a target steering angle calculator 72, a position controller 73, a power motor driver 74, a feedback steering angle calculator 75 and a compensation steering angle calculator 76.

The rear motor control unit 80 may include a reaction gain calculator 81, a rear motor driver 82, a differentiator 83, an LPF (Low Pass Filter) 84 and a compensation gain extractor 85.

In the present embodiment, the power motor control unit 70 and the rear motor control unit 80 may be separately implemented. In another embodiment, however, the power motor control unit 70 and the rear motor control unit 80 may be integrated into one control unit.

In the steering control apparatus of the SBW system in accordance with the embodiment of the present invention, the power motor PMT and the rear motor RMT may be simultaneously controlled in parallel to each other by the power motor control unit 70 and the rear motor control unit 80, respectively, according to sensing values inputted from the sensors. Therefore, operations of the steering angle sensor 10 and the vehicle velocity sensor 20 that sense a steering angle and vehicle velocity which are commonly required to control the power motor PMT and the rear motor RMT will be first described, and a configuration for controlling the power motor PMT through the power motor control unit 70 and a configuration for controlling the rear motor RMT through the rear motor control unit 80 will be then described.

The steering angle sensor 10 may sense a steering angle of a steering wheel operated by a driver. The steering angle sensor 10 may transmit the initial steering angle to the steering angle-motor position synchronizer 71 of the power motor control unit 70, the initial steering angle being initially sensed after the vehicle was started. Thus, as described later, a synchronization operation between the initial steering angle and the current angular position of the power motor PMT may be performed. When a steering operation is performed during operation of the vehicle after the synchronization operation, the steering angle sensor 10 may sense a steering angle in real time, and transmit the sensed steering angle to the target steering angle calculator 72 of the power motor control unit 70.

The vehicle velocity sensor 20 may sense the velocity of the vehicle in operation. The vehicle velocity sensor 20 may include various sensors, for example, a sensor for sensing a vehicle velocity using the angular velocity of a wheel, a sensor for sensing a vehicle velocity by measuring an engine RPM (Revolution Per Minute), and a sensor for sensing a vehicle velocity using the GPS (Global Positioning System).

Based on the above-described configuration, the configuration for controlling the power motor PMT through the power motor control unit 70 will be described with reference to FIG. 1.

The steering angle-motor position synchronizer 71 may receive the initial steering angle from the steering angle sensor 10, and synchronize the initial steering angle with the current angular position of the power motor PMT. For example, when the initial steering angle of the steering wheel is sensed as 10° by the steering angle sensor 10 after the vehicle was started, the steering angle-motor position synchronizer 71 may set the current angular position of the power motor PMT to 10° in order to synchronize the initial steering angle with the angular position of the power motor PMT.

The synchronization process may provide the following effect. As described later, the position controller 73 of the power motor control unit 70 in accordance with the embodiment of the present invention may receive a feedback steering angle calculated from the angular position of the power motor PMT, sensed by the power motor position sensor 50, and perform variable active steering and position control of the power motor PMT. The feedback steering angle may indicate a compensation steering angle calculated in consideration of a gear ratio and vehicle velocity. The steering angle sensor 10 may have a lower degree of precision than the power motor position sensor 50. Thus, when the angular position of the power motor PMT is sensed through the power motor position sensor 50 and converted into a steering angle to feedback control the angular position of the power motor PMT, the position control of the power motor PMT can be performed with more precision. Therefore, the synchronization operation may correspond to a prerequisite for calculating the steering angle from the angular position of the power motor PMT.

The synchronization operation may be performed only once after the vehicle is started, and a dotted line shown as an input/output of the steering angle-motor position synchronizer 71 in FIG. 1 may indicate that the synchronization operation is performed only once at the beginning.

The target steering angle calculator 72 may calculate a target steering angle from the steering angle which is sensed in real time by the steering angle sensor 10 according to a steering operation performed during operation of the vehicle, based on preset mapping information. The reason why the steering angle sensed by the steering angle sensor 10 is not directly set to the target steering angle, but the steering angle converted through the mapping information is set to the target steering angle is that, since the compensation steering angle inputted as a feedback steering angle to the position controller 73 is a steering angle converted from the angular position of the power motor (steering angle based on the angular position of the power motor), the types of signals, that is, the units of the signals need to coincide with each other in order to calculate a deviation between the target steering angle and the compensation steering angle. Therefore, the target steering angle calculator 72 may calculate the target steering angle (steering angle based on the motor angular position) from the steering angle sensed by the steering angle sensor 10, based on the preset mapping information.

The mapping information may be preset in the power motor control unit 70 depending on the specification of the steering system, and used for converting the angular position of the power motor PMT or used for the reverse operation. The mapping information may be set through various methods such as a function, map and lookup table, which indicate the corresponding relation between the steering angle and the angular position of the power motor PMT, and the conversion relation between the steering angle and the angular position of the power motor PMT may be set through a typical expression indicating a rack displacement (mm/rev) for one rotation of the steering wheel.

Therefore, the target steering angle calculator 72 may calculate the target steering angle based on the motor angular position from the steering angle received from the steering angle sensor 10, using the mapping information, and transmit the calculated target steering angle to the position controller 73.

The position controller 73 may initially drive the power motor PMT according to the target steering angle received from the target steering angle calculator 72. More specifically, the position controller 73 may output a power motor driving current corresponding to the target steering angle, and drive the power motor PMT. Furthermore, the position controller 73 may receive the feedback steering angle calculated from the angular position of the power motor PMT (compensation steering angle calculated in consideration of the gear ratio and vehicle velocity), and correct the target steering angle. This process will be described later.

On the path of the driving current which is outputted from the position controller 73 and inputted to the power motor PMT, the power motor driver 74 may be installed. In this case, the power motor driver 74 may detect the current of the currently driven power motor PMT through a current sensor, receives the detected current as a feedback current, and correct the current outputted from the position controller 73.

The power motor PMT may be driven in response to the power motor driving current from the position controller 73, and generate a linear motion of the rack, thereby outputting a steering force of the SBW system (rotating the wheel).

The power motor position sensor 50 may sense the angular position of the power motor PMT which is driven according to the target steering angle, that is, the rotation angle of the power motor PMT, and transmit the sensed angular position to the feedback steering angle calculator 75.

The feedback steering angle calculator 75 may calculate a feedback steering angle reflecting the current output angle of the wheel from the received angular position of the power motor PMT, based on the above-described mapping information. In other words, when the angular position of the currently driven power motor PMT is converted into the steering angle based on the above-described mapping information, the feedback steering angle reflecting the current output angle of the wheel can be recognized. Furthermore, since the feedback steering angle is calculated from the angular position of the power motor PMT, sensed through the power motor position sensor 50 having a more precise resolution, the feedback control for the power motor PMT can be performed with precision. Furthermore, since the feedback steering angle calculated from the angular position of the power motor PMT based on the mapping information is a steering angle based on the motor angular position, the type of the feedback steering angle may coincide with the type of the target steering angle outputted from the target steering angle calculator. Thus, a deviation therebetween can be calculated. Then, based on the calculated feedback steering angle, a gear ratio may be extracted from a steering angle-gear ratio map which will be described later.

The feedback steering angle calculator 75 may transmit the calculated feedback steering angle to the compensation steering angle calculator 76.

The compensation steering angle calculator 76 will be described as follows.

Since the SBW system has no mechanical connection parts such as a steering column, universal joint and pinion column between the steering wheel and the wheel, there is no connection part between the pinion and the rack. Therefore, a variable gear ratio effect such as VGR cannot be achieved through a mechanical method. In the present embodiment, the compensation steering angle calculator 76 can achieve the variable gear ratio effect through a preset steering angle-gear ratio map. More specifically, a gear ratio for the feedback steering angle received from the feedback steering angle calculator 75 may be extracted from the preset steering angle-gear ratio map. In a typical VGR system, a rack is manufactured in such a manner that a gear ratio corresponding to a steering angle of −30° to 30° is set to 1 and a gear ratio corresponding to the other regions is set to 1.2. Therefore, under the supposition that the received feedback steering angle is 40°, the gear ratio of 1.2 can be extracted from the steering angle-gear ratio map.

The steering angle-gear ratio map may not be limited to 1 and 1.2 corresponding to gear ratios of the typical VGR system, but designed in various manners depending on the specification of a steering system and a designer's intention, and then preset in the compensation steering angle calculator 76.

The compensation steering angle calculator 76 may calculate a compensation steering angle which is to be fed back to the position controller 73. More specifically, the compensation steering angle calculator 76 may calculate the compensation steering angle based on the feedback steering angle received from the feedback steering angle calculator 75, the extracted gear ratio, and the vehicle velocity sensed by the vehicle velocity sensor 20. For example, when the feedback steering angle is 40° and the gear ratio is set to 1.2, the compensation steering angle calculator 76 needs to feed back the compensation steering angle, such that the output angle of the wheel becomes 48° (=40° *1.2). However, in order to achieve the effect that the gear ratio is varied according to the vehicle velocity as in the AFS system, the compensation steering angle calculator 76 may calculate the final compensation steering angle by considering the vehicle velocity into the steering angle calculated as a multiplication of the feedback steering angle and the gear ratio (hereafter, referred to as the primary compensation steering angle). For example, when the vehicle velocity is low, the compensation steering angle calculator 76 may increase the final compensation steering angle over 48° corresponding to the primary compensation steering angle in order to achieve a fast steering characteristic, and when the vehicle velocity is high, the compensation steering angle calculator 76 may decrease the final compensation steering angle below 48° corresponding to the primary compensation steering angle in order to achieve a stable steering characteristic. The logic to increase/decrease the primary compensation steering angle depending on the vehicle velocity may be designed in various manners depending on the specification of a steering system and the intention of a designer, and preset in the compensation steering angle calculator 76.

In short, although a variable steering gear ratio device such as the AFS system or a rack having the VGR applied thereto is not installed, the steering control apparatus may calculate a compensation steering angle by presetting the steering angle-gear ratio map and the steering angle compensation logic considering a vehicle velocity, and feedback control the calculated compensation steering angle to drive the power motor PMT, thereby achieving the active steering effect that the gear ratio is varied.

The position controller 73 may correct the target steering angle inputted in real time based on the compensation steering angle, drive the power motor PMT according to the corrected target steering angle, and control the angular position of the power motor PMT to remove a deviation between the target steering angle and the compensation steering angle. The position controller 73 may be implemented with a PID (Proportional Integral Derivative) position controller in order to control the angular position of the power motor PMT such that the deviation is removed.

Next, referring to FIG. 1, the configuration for controlling the rear motor RMT through the rear motor control unit 80 will be described.

The rear motor RMT may be installed at the bottom of the column connected to the steering wheel, and output a reaction to a steering operation of a driver such that the driver can have a natural steering feel. That is, since the driver cannot feel resistance such as road surface friction in the SBW system in which the steering wheel and the wheels are mechanically separated from each other, the rear motor RMT may output an artificial reaction such that the driver can have a natural steering feel.

The yaw rate sensor 30 may sense the yaw rate of the vehicle. The yaw rate may indicate the ratio of the vehicle's rotations in the left and right directions around the Z-axis. The yaw rate may serve as a reference value for determining whether the vehicle is traveling on a flat road or determining the inclination of the vehicle. The yaw rate sensor 30 may transmit the sensed yaw rate to the reaction gain calculator 81.

The lateral acceleration sensor 40 may sense the lateral acceleration of the vehicle. The lateral acceleration may serve as a reference value for determining whether the vehicle is traveling on a flat road or determining the inclination of the vehicle. The lateral acceleration sensor 40 may transmit the sensed lateral acceleration to the reaction gain calculator 81.

The reaction gain calculator 81 may calculate a reaction gain through preset calculation logic, based on one or more of the steering angle, the vehicle velocity, the yaw rate and the lateral acceleration which are sensed by the steering angle sensor 10, the vehicle velocity sensor 20, the yaw rate sensor 30 and the lateral acceleration sensor 40, respectively. Various traveling conditions such as the steering angle, the vehicle velocity, the yaw rate and the lateral acceleration may be considered to improve the output response of a reaction force, and the reaction gain may be defined as a force for driving the rear motor RMT to output a reaction force, and processed as a parameter such as a reaction torque or target rear motor angle. The calculation logic may be set as a reaction function, reaction torque map or reaction torque lookup table which defines the relation of the reaction torque with respect to the steering angle, the vehicle velocity, the yaw rate and the lateral acceleration.

The reaction gain calculator 81 may drive the rear motor RMT according to the reaction gain, or specifically output a rear motor driving current corresponding to the reaction gain and drive the rear motor RMT to output a reaction force.

On the path of the driving current which is outputted from the reaction gain calculator 81 and inputted to the rear motor RMT, the rear motor driver 82 may be installed. In this case, the rear motor driver 82 may detect the current of the currently driven rear motor RMT through the current sensor, receive the detected current as a feedback current, and correct the current outputted from the reaction gain calculator 81.

In the present embodiment, the steering control apparatus may decide the compensation gain by detecting the angular position of the driven rear motor RMT through the rear motor position sensor 60, and feed back the compensation gain to the reaction gain calculator 81 to compensate for the reaction gain.

For this operation, the rear motor position sensor 60 may sense the angular position of the rear motor RMT and the sensed angular position to the differentiator 83.

The differentiator 83 may calculate the angular velocity of the rear motor by differentiating the received angular position of the rear motor RMT, and transmit the angular velocity to the LPF 84.

The LPF 84 may remove low-frequency noise, generated while the angular position of the rear motor RMT is differentiated, from received the rear motor angular velocity signal, and transmit the rear motor angular velocity signal to the compensation gain extractor 85.

The compensation gain extractor 85 may extract a compensation gain for the rear motor angular velocity from a preset angular velocity-compensation gain map, and feed back the extracted compensation gain to the reaction gain calculator 81. The angular velocity-compensation gain map may be designed in various manners depending on the specification of a steering system and a designer's intention, and preset in the compensation gain extractor 85.

The reaction gain calculator 81 may correct the calculated reaction gain using the compensation gain, based on the steering angle, the vehicle velocity, the yaw rate and the lateral acceleration which are received from the respective sensors, and drive the rear motor RMT according to the corrected reaction gain.

In short, the reaction gain calculator 81 may calculate the reaction gain according to the traveling conditions of the vehicle, and drive the rear motor. At this time, the reaction gain calculator 81 may receive the angular position of the rear motor RMT and the rear motor angular velocity corresponding to the angular position, and variably control the reaction force depending on the traveling state of the vehicle, thereby providing a more natural steering feel.

Figure 2:
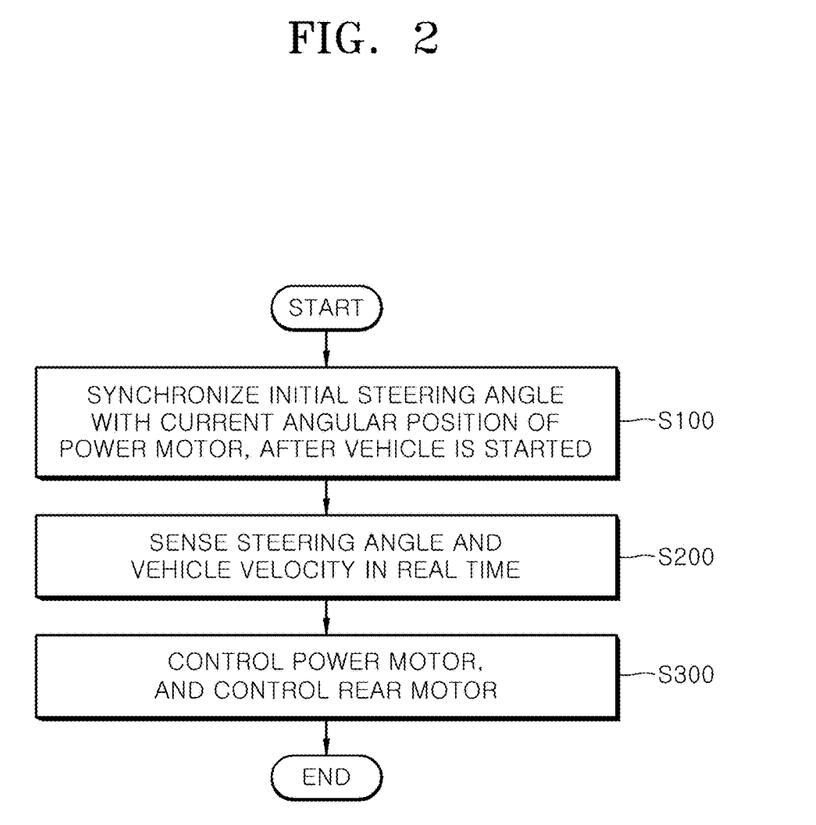
FIG. 2 is a flowchart schematically illustrating a process of controlling a power motor and a rear motor in a steering control method of an SBW system in accordance with an embodiment of the present invention.
Figure 3:
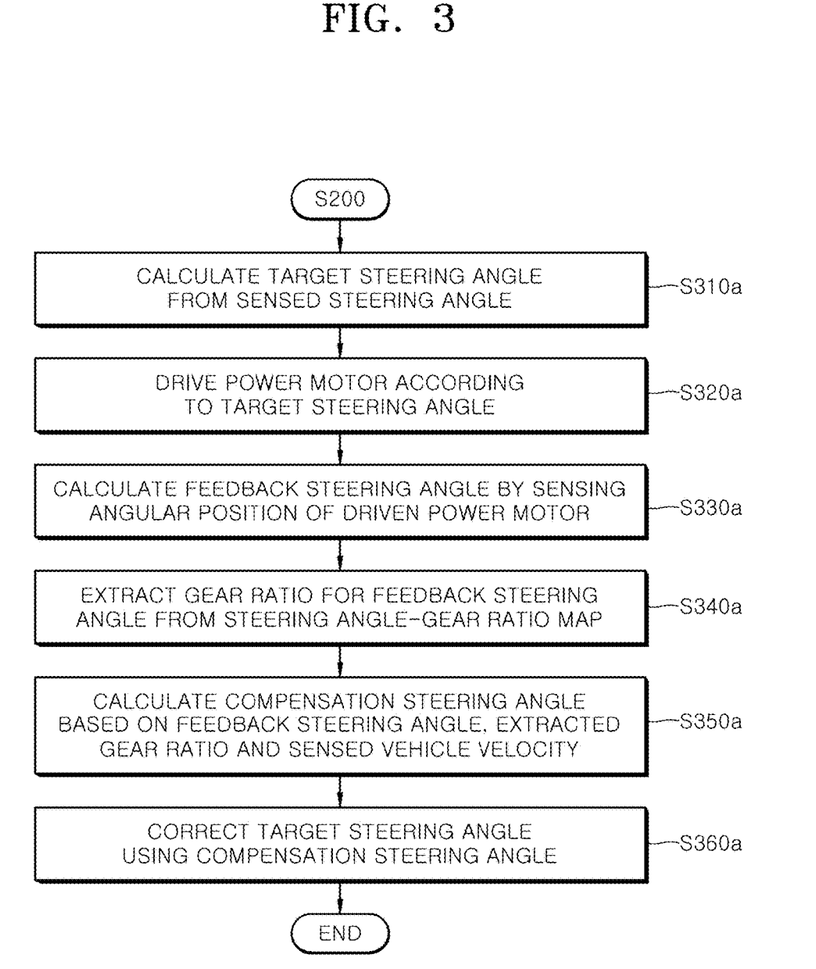
FIG. 3 is a flowchart for describing a process of controlling the power motor in the steering control method of an SBW system in accordance with the embodiment of the present invention.
Figure 4:
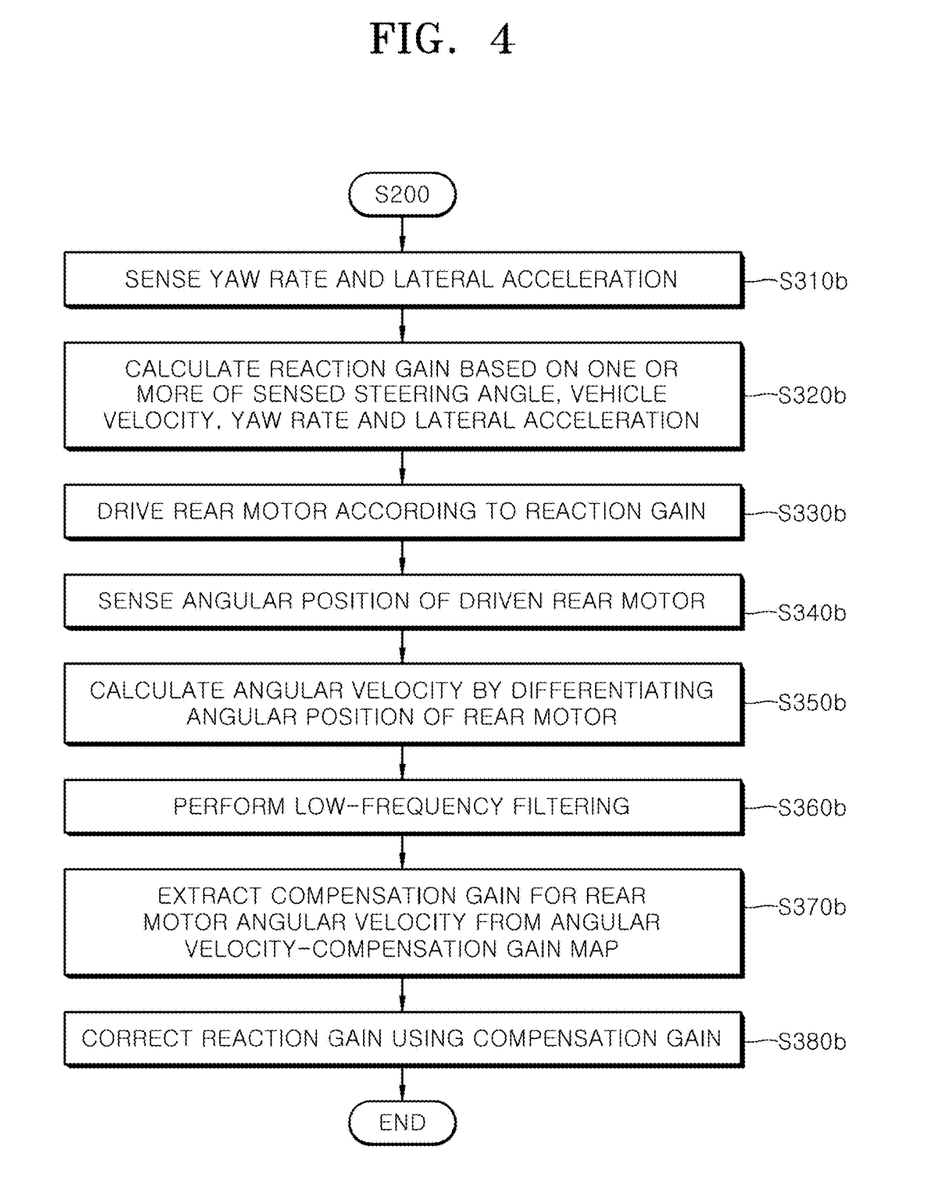
FIG. 4 is a flowchart for describing a process of processing the rear motor in the steering control method of an SBW system in accordance with the embodiment of the present invention.

FIG. 2 is a flowchart schematically illustrating a process of controlling the power motor and the rear motor in a steering control method of an SBW system in accordance with an embodiment of the present invention, FIG. 3 is a flowchart for describing a process of controlling the power motor in the steering control method of an SBW system in accordance with the embodiment of the present invention, and FIG. 4 is a flowchart for describing a process of processing the rear motor in the steering control method of an SBW system in accordance with the embodiment of the present invention.

Referring to FIG. 2, the process of controlling the power motor PMT and the rear motor RMT in the steering control method of the SBW system in accordance with the embodiment of the present invention will be described. First, the power motor control unit 70 may synchronize the initial steering angle of the steering wheel, which is initially sensed through the steering angle sensor 10, with the current angular position of the power motor PMT, after the vehicle is started, at step S100.

The steering angle sensor 10 and the vehicle velocity sensor 20 may sense the steering angle of the steering wheel and the vehicle velocity of the vehicle, respectively, at step S200. The steering angle sensor 10 and the vehicle velocity sensor 20 may sense the steering angle and the vehicle velocity in real time, and output the sensed steering angle and vehicle velocity to the power motor control unit 70 and the rear motor control unit 80, respectively.

The power motor control unit 70 and the rear motor control unit 80 may control the power motor PMT and the rear motor RMT based on the sensed steering angle and vehicle velocity, respectively, at step S300.

Next, referring to FIG. 3, the process of controlling the power motor PMT in the steering control method of the SBW system in accordance with the embodiment of the present invention will be described as follows.

The power motor control unit 70 may calculate the target steering angle from the sensed steering angle, based on the preset mapping information, at step S310a.

Then, the power motor control unit 70 may drive the power motor PMT that outputs a steering force in the SBW system, according to the target steering angle, at step S320a.

Then, the power motor control unit 70 may detect the angular position of the power motor PMT through the power motor position sensor 50, and calculate a feedback steering angle reflecting the current output angle of the wheel based on the mapping information, at step S330a.

Then, the power motor control unit 70 may calculate a compensation steering angle for variably controlling the output angle of the wheel, based on the feedback steering angle and the sensed vehicle velocity, and correct the target steering angle using the compensation steering angle, at steps S320a to S360a.

More specifically, the power motor control unit 70 may extract a gear ratio for the feedback steering angle from the preset steering angle-gear ratio map at step S340a, and calculate the compensation steering angle based on the feedback steering angle, the extracted gear ratio and the vehicle velocity at step S350a. Furthermore, the power motor control unit 70 may correct the target steering angle inputted in real time using the compensation steering angle at step S360a, drive the power motor PMT according to the corrected target steering angle, and control the angular position of the power motor PMT such that a deviation between the target steering angle and the compensation steering angle is removed. The position controller 73 may be implemented with a PID position controller in order to control the angular position of the power motor PMT such that the deviation is removed.

Next, referring to FIG. 4, the process of controlling the rear motor RMT in the steering control method of the SBW system in accordance with the embodiment of the present invention will be described as follows.

The yaw rate sensor 30 and the lateral acceleration sensor 40 may sense the yaw rate and lateral acceleration of the vehicle, respectively, at step S310b. The yaw rate sensor 30 and the lateral acceleration sensor 40 may sense the yaw rate and the lateral acceleration in real time, respectively, and output the sensed yaw rate and lateral acceleration to the rear motor control unit 80.

Then, the rear motor control unit 80 may calculate a reaction gain based on one or more of the sensed steering angle, vehicle velocity, yaw rate and lateral acceleration, at step S320b.

Then, the rear motor control unit 80 may drive the rear motor RMT that outputs a reaction force in the SBW system, according to the reaction gain, at step S330b. That is, the rear motor control unit 80 may output a rear motor driving current corresponding to the reaction gain, and drive the rear motor RMT to output a reaction force.

Then, the rear motor position sensor 60 may sense the angular position of the driven rear motor RMT at step S340b.

Then, the rear motor control unit 80 may calculate a rear motor angular velocity by differentiating the sensed angular position of the rear motor RMT at step S350b, and remove low-frequency noise generated during the differentiation process through low-frequency filtering at step S360b. Then, the rear motor control unit 80 may extract a compensation gain for the rear motor angular velocity from the preset angular velocity-compensation gain map at step S370b, and correct the reaction gain using the correction gain at step S380b.

Therefore, the rear motor control unit 80 may drive the rear motor RMT according to the correction reaction gain, and vary the reaction force depending on the traveling state of the vehicle, thereby providing a more natural steering feel.

As described above, the process of controlling the power motor PMT and the process of controlling the rear motor RMT may be simultaneously performed in parallel to each other while the vehicle is traveling, and not limited to the above-described sequence.

Therefore, the steering control apparatus and method may control the power motor PMT only by using the steering angle and the angular position of the power motor PMT, and implement MDPS without a torque sensor, thereby removing a sense of difference in a driver's steering operation, which may be caused by an abnormal operation of the torque sensor. Furthermore, the steering control apparatus and method may employ the variable gear ratio logic without mechanical components for varying the steering gear ratio, thereby not only reducing the weight of the system but also allowing variable active steering in real time. Furthermore, the steering control apparatus and method may receive the angular position signal of the rear motor RMT in real time to control the rear motor RMT, and vary the reaction force depending on the traveling state of the vehicle, thereby providing a more natural steering feel.

In accordance with the embodiments of the present invention, the steering control apparatus and method can implement MDPS without a torque sensor, and thus remove a sense of difference in a driver's steering operation, which may be caused by an abnormal operation of the torque sensor. Furthermore, the steering control apparatus and method may employ the variable gear ratio logic without mechanical components for varying a steering gear ratio, thereby enabling variable active steering in real time while reducing the weight of the system.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A steering control apparatus of a Steer By Wire (SBW) system for a vehicle, comprising:
   a power motor configured to output a steering force in the SBW system;
   a power motor position sensor configured to sense an angular position of the power motor;
   a steering angle sensor configured to sense a steering angle of a steering wheel;
   a vehicle velocity sensor configured to sense a vehicle velocity; and
   a power motor control unit configured to calculate a target steering angle from the steering angle sensed by the steering angle sensor, and drive the power motor based on the target steering angle,
   wherein the power motor control unit is configured:
   to calculate a feedback steering angle reflecting an output angle of a tire wheel by detecting the angular position of the power motor through the power motor position sensor
   to calculate a compensation steering angle for variably controlling the output angle of the tire wheel based on the feedback steering angle and the vehicle velocity sensed by the vehicle sensor, and
   to correct the target steering angle using the compensation steering angle.

2. The steering control apparatus of claim 1, wherein the power motor control unit is configured to extract a gear ratio for the feedback steering angle from a preset steering angle-gear ratio map, and to calculate the compensation steering angle based on the feedback steering angle, the extracted gear ratio and the vehicle velocity.

3. The steering control apparatus of claim 1, wherein the power motor control unit is configured to synchronize an initial steering angle sensed through the steering angle sensor with the angular position of the power motor, after the vehicle is started.

4. The steering control apparatus of claim 1, further comprising:
   a rear motor configured to output a steering reaction force in the SBW system;
   a yaw rate sensor configured to sense a yaw rate of the vehicle;
   a lateral acceleration sensor configured to sense a lateral acceleration of the vehicle; and
   a rear motor control unit configured to calculate a reaction gain based on one or more of the steering angle, the vehicle velocity, the yaw rate and the lateral acceleration, which are sensed by the steering angle sensor, the vehicle velocity sensor, the yaw rate sensor and the lateral acceleration sensor, respectively, and drive the rear motor according to the reaction gain.

5. The steering control apparatus of claim 4, further comprising a rear motor position sensor configured to sense an angular position of the rear motor,
   wherein the rear motor control unit calculates a rear motor angular velocity by differentiating the angular position of the rear motor, sensed through the rear motor position sensor, and performing low-frequency filtering, extracts a compensation gain for the rear motor angular velocity from a preset angular velocity-compensation gain map, and corrects the reaction gain using the compensation gain.

6. A steering control method of an SBW system, comprising:
   sensing, by a steering angle sensor and vehicle velocity sensor, a steering angle of a steering wheel and a velocity of a vehicle, respectively;
   calculating, by a power motor control unit, a target steering angle from the sensed steering angle;
   driving, by the power motor control unit, a power motor that outputs a steering force in the SBW system, based on the target steering angle;
   sensing, by the power motor control unit, an angular position of the power motor through the power motor position sensor, and calculating a feedback steering angle reflecting a current output angle of a tire wheel; and
   calculating, by the power motor control unit, a compensation steering angle for variably controlling an output angle of the tire wheel based on the feedback steering angle and the sensed vehicle velocity, and correcting the target steering angle using the compensation steering angle.

7. The steering control method of claim 6, wherein in the correcting of the target steering angle using the compensation steering angle,
   the power motor control unit extracts a gear ratio for the feedback steering angle from a preset steering angle-gear ratio map, and calculates the compensation steering angle based on the feedback steering angle, the extracted gear ratio and the sensed vehicle velocity.

8. The steering control method of claim 6, further comprising synchronizing, by the power motor control unit, the initial steering angle sensed through the steering angle sensor with the current angular position of the power motor, after the vehicle is started.

9. The steering control method of claim 6, further comprising:
   sensing, by a yaw rate sensor and lateral acceleration sensor, a yaw rate and lateral acceleration of the vehicle, respectively;
   calculating, by a rear motor control unit, a reaction gain based on one or more of the sensed steering angle, vehicle velocity, yaw rate and lateral acceleration; and
   driving, by the rear motor control unit, a rear motor that outputs a reaction force in the SBW system, according to the reaction gain.

10. The steering control method of claim 9, further comprising:
    sensing, by a rear motor position sensor, an angular position of the rear motor; and
    calculating, by the rear motor control unit, a rear motor angular velocity by differentiating the sensed angular position of the rear motor and performing low-frequency filtering, extracting a compensation gain for the rear motor angular velocity from a preset angular velocity-compensation gain map, and correcting the reaction gain using the compensation gain.

* * * * *